US012207709B2

(12) United States Patent
Isawa et al.

(10) Patent No.: US 12,207,709 B2
(45) Date of Patent: Jan. 28, 2025

(54) ZIPPER ASSEMBLY FOR RECLOSABLE ENCLOSURE

(71) Applicant: Illinois Tool Works Inc., Glenview, IL (US)

(72) Inventors: Newton Akira Isawa, São Paulo (BR); Jorge Scarpim, São Paulo (BR); Clifton R. Howell, Elburn, IL (US); Jeffry Mauro, Montgomery, NY (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 67 days.

(21) Appl. No.: 18/120,505

(22) Filed: Mar. 13, 2023

(65) Prior Publication Data

US 2023/0301404 A1 Sep. 28, 2023

Related U.S. Application Data

(60) Provisional application No. 63/323,360, filed on Mar. 24, 2022.

(51) Int. Cl.
*B65D 33/16* (2006.01)
*A44B 19/26* (2006.01)
(Continued)

(52) U.S. Cl.
CPC ............ *A44B 19/267* (2013.01); *A44B 19/62* (2013.01); *B31B 70/8131* (2017.08); *B65D 33/2541* (2013.01); *B31B 2150/00* (2017.08)

(58) Field of Classification Search
CPC ...................................................... A44B 19/62
See application file for complete search history.

(56) References Cited

U.S. PATENT DOCUMENTS 4,430,070 A * 2/1984 Ausnit ................ B29C 66/1122 493/215
4,578,813 A * 3/1986 Ausnit ............... B65D 33/2541 383/65

(Continued)

FOREIGN PATENT DOCUMENTS

DE 69025093 T2 9/1996
EP 398731 A * 11/1990 ......... B65D 33/2533
WO WO-2016114304 A1 * 7/2016 ............. A44B 19/16

OTHER PUBLICATIONS

EP (Year: 1990).*

(Continued)

*Primary Examiner* — Jason W San
(74) *Attorney, Agent, or Firm* — Christopher R. Carroll; The Small Patent Law Group LLC

(57) ABSTRACT

A zipper assembly for a reclosable enclosure includes a first profile having a first elongated supporting element and first protruding intermeshing elements. The zipper assembly also may include a second profile having a second elongated supporting element and one or more second intermeshing elements protruding from the second elongated supporting element. The one or more first intermeshing elements may releasably interlock with the one or more second intermeshing elements to close the enclosure. Each of the first elongated supporting element and the second elongated supporting element may include a thicker portion and a thinner portion. The thicker portions of the first elongated supporting element and the second elongated supporting element may be coupled with one or more panels of the enclosure. The thicker portions of the first elongated supporting element and the second elongated supporting element may be disposed on a consumer side of the enclosure.

18 Claims, 7 Drawing Sheets

(51) Int. Cl.

| | |
|---|---|
| ***A44B 19/62*** | (2006.01) |
| ***B31B 70/81*** | (2017.01) |
| ***B65D 33/25*** | (2006.01) |
| *B31B 150/00* | (2017.01) |

(56) References Cited

U.S. PATENT DOCUMENTS

| | | | | |
|---|---|---|---|---|
| 6,138,329 | A * | 10/2000 | Johnson | B65B 61/188 24/584.1 |
| 6,185,796 | B1 * | 2/2001 | Ausnit | B65D 33/2541 24/585.1 |
| 8,272,107 | B2 * | 9/2012 | Turvey | B65D 33/01 383/44 |
| 9,745,104 | B2 * | 8/2017 | Sanfilippo | B65B 61/184 |
| 10,207,850 | B2 * | 2/2019 | Sanfilippo | B65D 75/5838 |
| 10,315,829 | B2 * | 6/2019 | McDonald | B65D 81/075 |
| 10,661,963 | B2 * | 5/2020 | Bazbaz | B65D 31/02 |
| 10,994,882 | B2 * | 5/2021 | Sanfilippo | B65B 61/28 |
| 11,124,348 | B2 * | 9/2021 | McDonald | B65D 81/075 |
| 11,305,927 | B2 * | 4/2022 | Bazbaz | B65D 33/16 |
| 11,459,157 | B2 * | 10/2022 | Bazbaz | B65D 33/02 |
| 2010/0150477 | A1 * | 6/2010 | Bois | B65D 33/2508 383/42 |
| 2010/0209020 | A1 * | 8/2010 | Delasalle | B65D 33/2508 383/64 |
| 2012/0045151 | A1 * | 2/2012 | Eouzan | B65D 33/2541 383/42 |
| 2018/0118414 | A1 * | 5/2018 | Martial | B65D 33/255 |

OTHER PUBLICATIONS

WO (Year: 2016).*

Partial search report dated Jul. 7, 2023 received for corresponding European Patent Application No. 23163587.1 (16 pages).

Extended European search report dated Oct. 10, 2023 received for corresponding European Patent Application No. 23163587.1 (13 pages).

* cited by examiner

ZIPPER ASSEMBLY FOR RECLOSABLE ENCLOSURE

CROSS-REFERENCE TO RELATED APPLICATIONS

This application claims priority to U.S. Provisional Application No. 63/323,360 (filed 24 Mar. 2022), the entire disclosure of which is incorporated herein by reference.

BACKGROUND

Technical Field

The subject matter described herein relates to zipper assemblies for reclosable enclosures, such as bags formed from polymers or other materials.

Discussion of Art

Many enclosures include reclosable assemblies to allow users to repeatedly open and close the enclosures. For example, plastic bags may have zipper assemblies having opposing profiles formed from intermeshing or interlocking elements. These elements may be bodies having complimentary or matching shapes to allow the profiles to interlock with each other to close the enclosure. A user may pull the profiles away from each other with sufficient force to separate the elements to open the enclosure.

The zipper assemblies can be coupled with the enclosures by attaching opposite sides of the profiles with panels of the enclosures. For example, the back sides of the zipper assemblies can be heat sealed to interior surfaces of the panels of the enclosure. One problem with some known zipper assemblies is misalignment between the devices that seal the zipper assemblies to the panels and the zipper assemblies themselves. The zipper assemblies may be narrow, which can make it more difficult to align a device (e.g., a heat seal bar) with the areas on the backsides of the zipper assemblies during sealing of the zipper assemblies to the enclosure panels.

One known solution to this alignment problem is to increase the interface area of the zipper assemblies that are sealed to the panels. For example, all or a large portion of the surface area of the zipper assembly that is opposite the interlocking profile may be sealed to the panels. This can make alignment between the sealing device and the zipper assemblies easier but can make it more difficult for the user to open the zipper assemblies. For example, the interlocking elements that are closer to the user may separate with application of a pulling force, but this pulling force may need to be increased by an amount that some users are unable to provide as the interlocking elements that are farther from the user (and closer to the product inside the enclosure) remain intermeshed with each other.

BRIEF DESCRIPTION

In one example, a zipper assembly for a reclosable enclosure is provided. The zipper assembly may include a first profile having a first elongated supporting element and one or more first intermeshing elements protruding from the first elongated supporting element. The zipper assembly also may include a second profile having a second elongated supporting element and one or more second intermeshing elements protruding from the second elongated supporting element. The one or more first intermeshing elements may releasably interlock with the one or more second intermeshing elements to close the enclosure. Each of the first elongated supporting element and the second elongated supporting element may include a thicker portion and a thinner portion. The thicker portions of the first elongated supporting element and the second elongated supporting element may be coupled with one or more panels of the enclosure. The thicker portions of the first elongated supporting element and the second elongated supporting element may be disposed on a consumer side of the enclosure.

In another example, a zipper assembly is provided that may include a first profile having a first elongated supporting element and one or more first intermeshing elements protruding from the first elongated supporting element. The zipper assembly also may include a second profile having a second elongated supporting element and one or more second intermeshing elements protruding from the second elongated supporting element. The one or more first intermeshing elements may releasably interlock with the one or more second intermeshing elements to close an enclosure. Each of the first elongated supporting element and the second elongated supporting element may include a thicker portion and a thinner portion. The thicker portions may be coupled with one or more panels of the enclosure without the thinner portions being coupled with the one or more panels of the enclosure. The thicker portions may be disposed farther from an interior volume of the enclosure than the thinner portions.

In another example, a method is provided that may include forming a first profile of a zipper assembly for a reclosable enclosure. The first profile may be formed as having a first elongated supporting element and one or more first intermeshing elements protruding from the first elongated supporting element. The method also may include forming a second profile of the zipper assembly. The second profile may be formed as having a second elongated supporting element and one or more second intermeshing elements protruding from the second elongated supporting element. The one or more first intermeshing elements may be formed to releasably interlock with the one or more second intermeshing elements to close the enclosure. The first elongated supporting element and the second elongated supporting element may be formed as including thicker portions and thinner portions. The thicker portions of the first elongated supporting element and the second elongated supporting element may be formed in a shape to be coupled with one or more panels of the enclosure in locations that are farther from an interior volume of the enclosure than the thinner portions.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide reclosable zipper assemblies having opposing profiles with intermeshing or interlocking elements that allow for the zipper assemblies to be repeatedly separated (e.g., to open an enclosure such as a plastic bag) and coupled (e.g., to close the enclosure). Back sides of the profiles of the zipper assemblies may have raised and/or recessed portions to assist in aligning sealing devices with the zipper assemblies when the zipper assemblies are coupled with panels of the enclosures. These raised and/or recessed portions of the zipper assembly profiles can assist in sealing the profiles to the enclosures in a way that reduces the amount of force required from users to completely separate the profiles from each other during opening of the enclosure (e.g., relative to zipper profiles that are coupled with the enclosures in another manner, such as by sealing more of the profile back sides to the panels).

Figure 1:
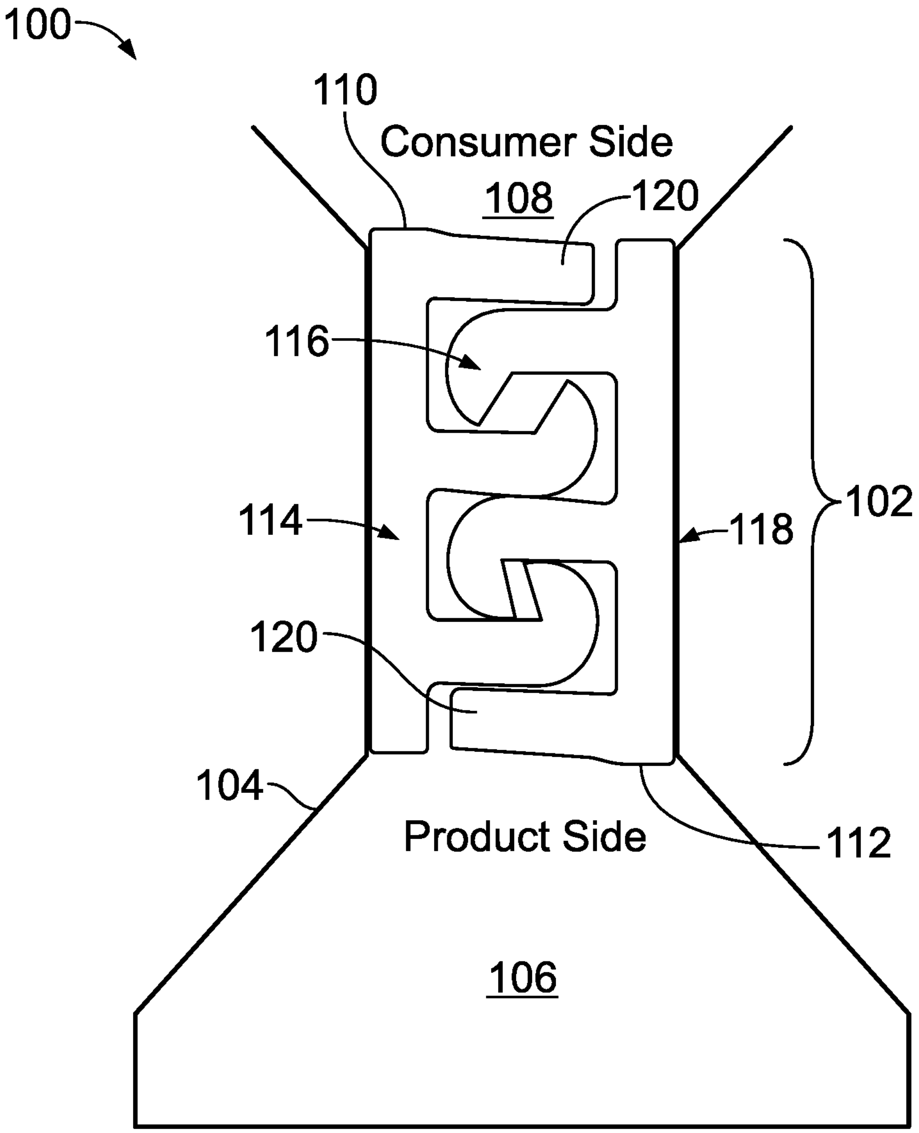
FIG. 1 illustrates a cross-sectional view of one example of an enclosure having a zipper assembly.

FIG. 1 illustrates a cross-sectional view of one example of an enclosure 100 having a zipper assembly 102. The enclosure 100 may be formed by panels 104 to which the zipper assembly 102 is coupled (e.g., heat sealed). A product side 106 of the enclosure 100 may define or be represented by an interior volume in which a product is stored in the enclosure 100. A consumer or user side 108 of the enclosure 100 is outside of the enclosure 100. A consumer or user can access the product side 106 by pulling the panels 104 apart from each other and separating the zipper assembly 102. The enclosure 100 can be closed by pressing the zipper assembly 102 together.

The zipper assembly 102 includes intermeshing or interlocking profiles 110, 112. These profiles 110, 112 include support elements 114 with intermeshing or interlocking elements 116, 120 protruding from the support elements 114. The support elements 114 may be planar bodies and at least some of the intermeshing or interlocking elements 116 may be curved bodies or bodies having complimentary shapes. One or more of the intermeshing or interlocking elements 120 may be flat or planar bodies. For example, the outermost interlocking element 120 (e.g., the interlocking element 120 that is closest to the consumer side 108) and/or the innermost interlocking element 120 (e.g., the interlocking element 120 that is closest to the product side 106) may not include any curved portion, as shown in FIG. 1. Conversely, the intermeshing or interlocking elements 116 may be J-shaped bodies (or backward J-shaped bodies) or may have another shape. The intermeshing or interlocking of these elements 116 keeps the enclosure 100 closed until the user or consumer pulls the panels 104 and profiles 110, 112 apart from each other.

As shown in FIG. 1, back surfaces 118 of the support elements 114 are planar surfaces with the panels 104 coupled with the back surfaces 118. The panels 104 may be heat sealed to the back surfaces 118 with all or substantially all (e.g., at least 90% or another percentage) of the back surfaces 118 coupled with the panels 104. Coupling predominantly all of the back surfaces 118 to the panels 104 can make it easier to align the sealing device (e.g., heat sealing bars) with the back surfaces 118 during coupling (e.g., heat sealing) of the profiles 110, 112 to the panels 104. For example, heat sealing all or the supermajority of the back sides or surfaces 118 of the zipper assembly 102 to the panel(s) 104 can provide a larger or wider target (e.g., measured in the vertical direction in the perspective of FIG. 1) relative to heat sealing a smaller portion of the back sides or surfaces 118.

Figure 2:
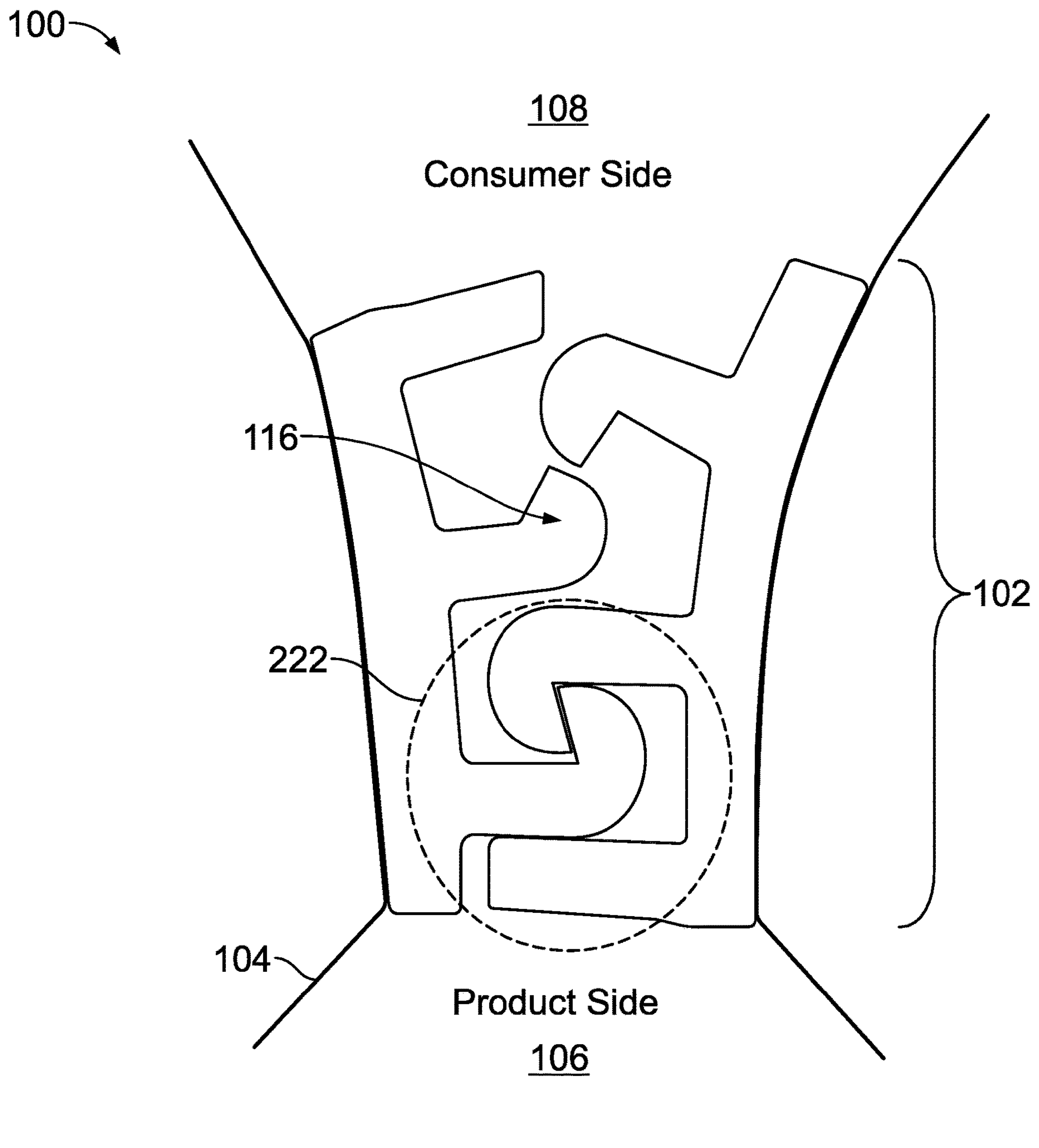
FIG. 2 illustrates the zipper assembly shown in FIG. 1 during attempted opening of the enclosure also shown in FIG. 1.

FIG. 2 illustrates the zipper assembly 102 shown in FIG. 1 during attempted opening of the enclosure 100 also shown in FIG. 1. One problem with coupling all or predominantly all of the back sides or surfaces 118 of the zipper assembly 102 with the panel(s) 104 is that the amount of pulling force required to separate the intermeshing elements 116 from each other can be significant. For example, the last intermeshing element(s) 116 (enclosed within a circle 222 in FIG. 2) may require significant force to separate (and more force that required to separate the first few intermeshing elements 116). The amount of required pulling force (e.g., exerted to pull the profiles 110, 112 apart) may result in tearing the panel(s) 104, separating the zipper assembly 102 from the panel(s) 104, or otherwise damaging the enclosure 100 such that the enclosure 100 may not be able to be reused.

Figure 3:
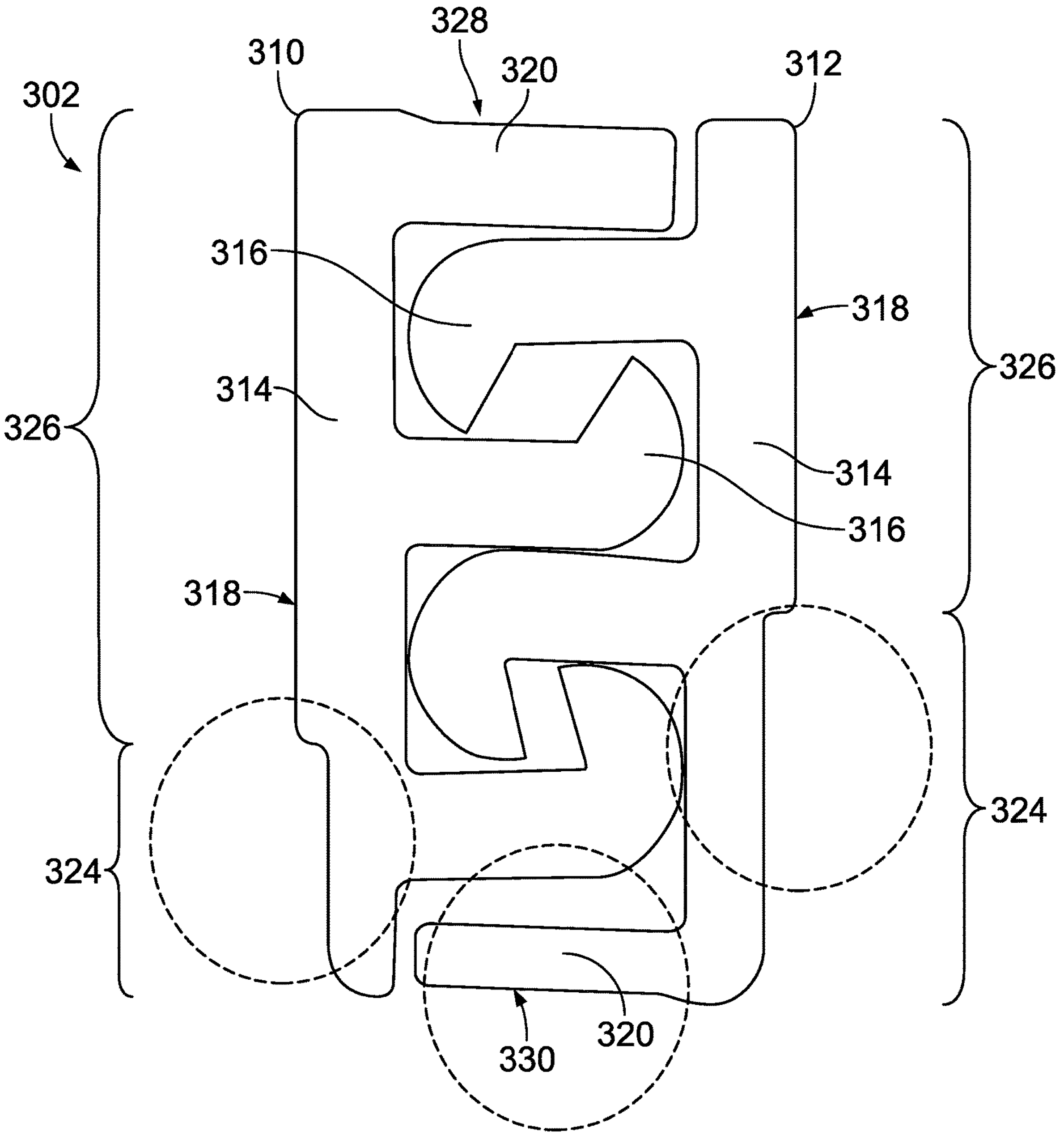
FIG. 3 illustrates a cross-sectional view of a zipper assembly according to one embodiment of the inventive subject matter.
Figure 4:
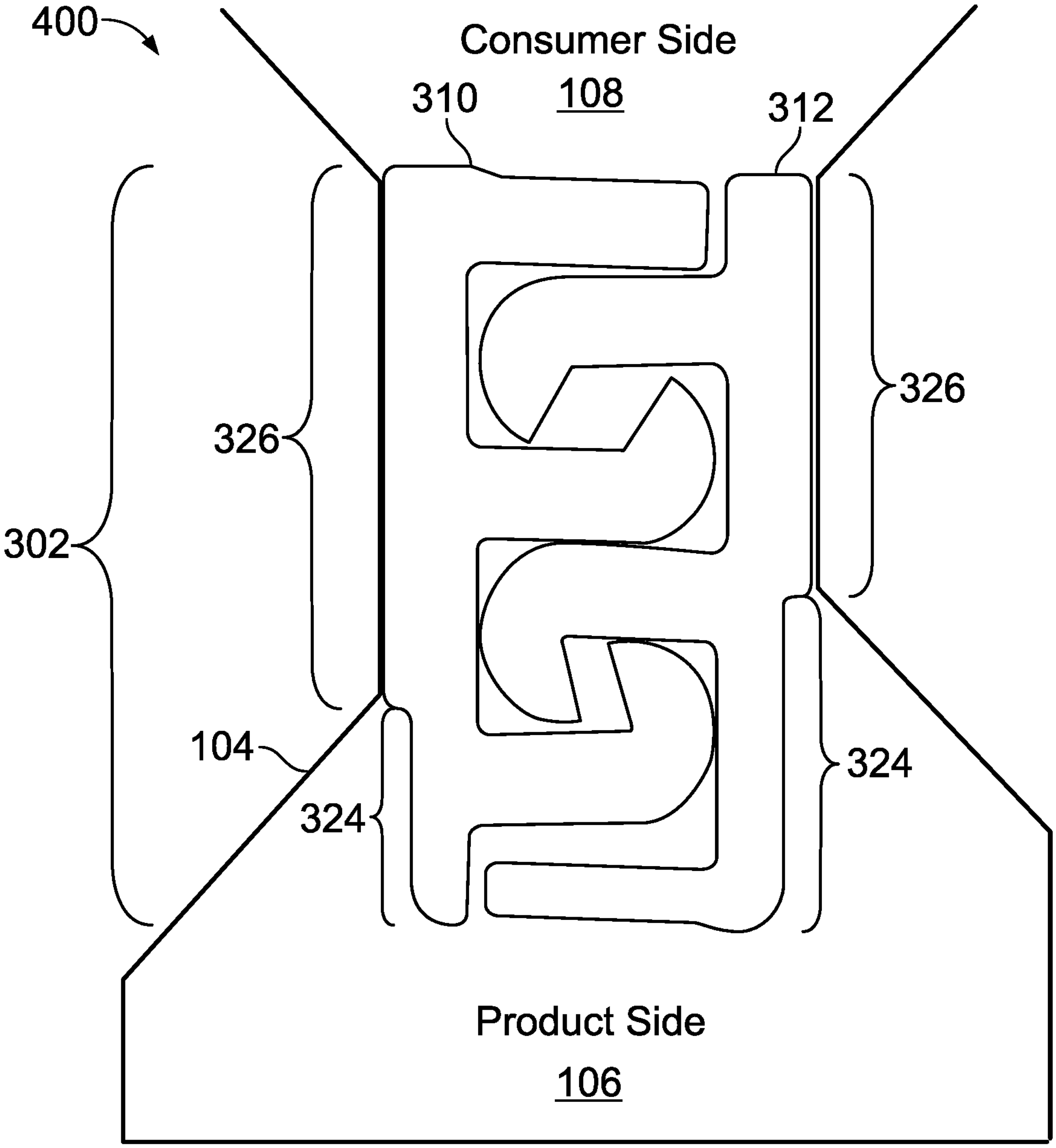
FIG. 4 illustrates the zipper assembly shown in FIG. 3 coupled with a reclosable enclosure.

FIG. 3 illustrates a cross-sectional view of a zipper assembly 302 according to one embodiment of the inventive subject matter. FIG. 4 illustrates the zipper assembly 302 shown in FIG. 3 coupled with a reclosable enclosure 400. The enclosure 400 may be similar or identical to the enclosure 100 but for the zipper assembly 302. The zipper assembly 302 may be used in place of the zipper assembly 102 shown in FIGS. 1 and 2 to provide for the resealable or reclosable enclosure 400 that does not require as much force to open the zipper assembly 302 as the zipper assembly 102. The zipper assembly 302 includes intermeshing or interlocking profiles 310, 312. These profiles 310, 312 include support elements 314 with intermeshing or interlocking elements 316, 320 protruding from the support elements 314.

The support elements 314 may be non-planar bodies and at least some of the intermeshing or interlocking elements 316 may be elongated bodies having curved bodies, ends, or heads, or may be other bodies having complimentary shapes. One or more of the intermeshing or interlocking elements 320 may be elongated bodies that do not include curved ends or heads. For example, the outermost interlocking element 320 and/or the innermost interlocking element 320 may not include any curved end. The intermeshing or interlocking of the elements 316 keeps the enclosure to which the zipper assembly 302 is joined closed until the user or consumer pulls the panels and profiles 310, 312 apart from each other.

As shown in FIG. 3, the support elements 314 of the zipper assembly 302 include thinner portions 324 and thicker portions 326. The thinner portions 324 may have smaller thicknesses (measured along normal or perpendicular directions to back surfaces 318 of the support elements 314, which may be the same directions in which the intermeshing elements 316 are elongated) than the thicker portions 326. The thicker portions 326 may extend from a consumer end 328 of the zipper assembly 302 toward, but not all the way to, a product end 330 of the zipper assembly 302. The consumer end 328 of the zipper assembly 302 may be the end that is closer or closest to the consumer (and farther or farthest from the interior volume of the enclosure to which the zipper assembly 302 is coupled) when compared with the product end 330. Similarly, the product end

330 of the zipper assembly 302 may be the end that is closer or closest to the interior volume (and farther or farthest from the consumer side) when compared with the consumer end 328.

The thinner portions 324 may extend from the product end 330 of the zipper assembly 302 toward, but not all the way to, the consumer end 328 of the zipper assembly 302. In the illustrated embodiment, the thinner portions 324 extend over less than half of the total distance or length of the zipper assembly 302 from the product end 330 to the consumer end 328 (or from the consumer end 328 to the product end 330). For example, the thinner portion 324 of the profile 310 may extend to no more than 25% of the total length of the profile 310 from the product end 330 to the consumer end 328. The thinner portion 324 of the profile 312 may extend to no more than 50% of the total length of the profile 312 from the product end 330 to the consumer end 328. Alternatively, one or both of the thinner portions 324 may extend over greater or lesser parts of the overall length of the corresponding profile 310, 312. In the illustrated embodiment, each of the thicker portions 326 continuously extends from the consumer end 328 to the thinner portion 324 of the same profile 310 or 312 and each of the thinner portions 324 continuously extends from the product end 330 to the thicker portion 326 of the same profile 310 or 312. As a result, each profile 310, 312 may include only a single thicker portion 326 and a single thinner portion 324. Alternatively, the locations of the thicker and thinner portions 326, 324 for each profile 310, 312 may be switched. Optionally, one or both of the profiles 310, 312 may include multiple thinner portions 324 and/or multiple thicker portions 326.

At least one of the intermeshing elements 316, 320 may protrude from the thinner portion 324 of each profile 310, 312. For example, the intermeshing element 320 that is closest to the product end 330 or product side of the enclosure having the zipper assembly 302 may protrude or extend from the thinner portion 324 of the profile 312. One of the intermeshing elements 316 of the profile 310 may protrude or extend from the thinner portion 324 of the profile 310. Optionally, multiple intermeshing elements 316 and/or 320 may protrude or extend from the thinner portion 324 of the profile 310 and/or the profile 312.

As shown in FIG. 3, the intermeshing element 320 of the profile 312 is thinner than the intermeshing element 320 of the profile 310. For example, the intermeshing element 320 that is closer or closest to the product side of the enclosure (to which the zipper assembly 302 is coupled) may be thinner than the intermeshing element 320 of the profile 310 that is farther or farthest from the product side of the enclosure.

The panels 104 of the enclosure 400 may be coupled with the thicker portions 326 of the profiles 310, 312 of the zipper assembly 302, as shown in FIG. 4. The panels 104 may not be coupled with the thinner portions 324 of the profiles 310, 312. For example, the panels 104 may be heat sealed to the thicker portions 326 of the profiles 310, 312 but not to the thinner portions 324 of the profiles 310, 312. The difference in thicknesses between the thinner portion 324 and thicker portion 326 along the back side or surface of each profile 310, 312 can provide a visual and/or tactile (e.g., perceptible by touch) reference or marker for locations to couple the panel(s) 104 to the profiles 310, 312. For example, the thicker portions 326 may feel raised or projecting relative to the thinner portions 324, and the raised or projecting feel of the thicker portions 326 can be used to align the device (e.g., the heat seal bars) used to heat seal the panel(s) 104 to the thicker portions 326.

Figure 5:
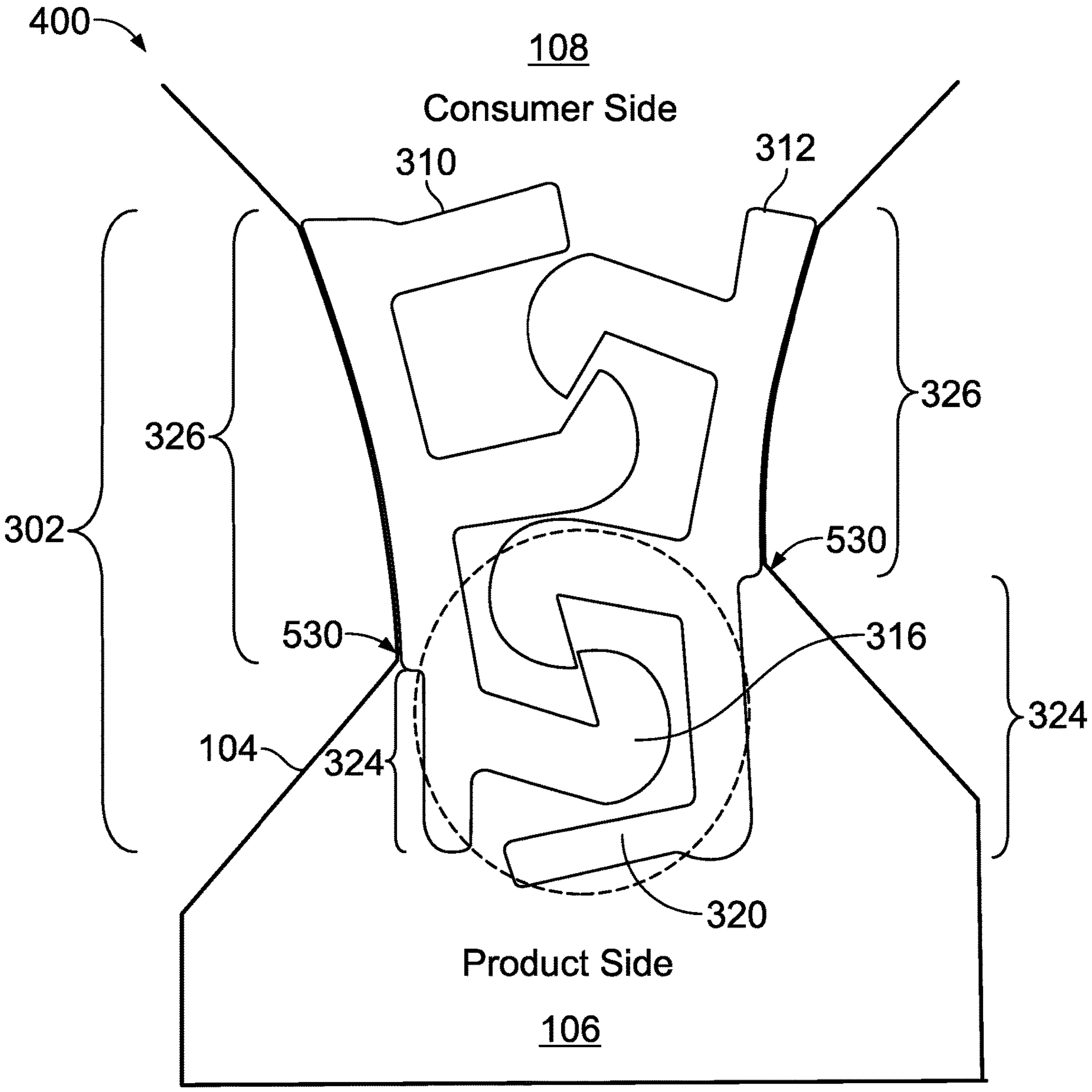
FIG. 5 illustrates opening of the enclosure shown in FIG. 4 having the zipper assembly shown in FIG. 3 with the thicker and thinner portions also shown in FIG. 3 according to one example.

FIG. 5 illustrates opening of the enclosure 400 having the zipper assembly 302 with the thicker and thinner portions 326, 324 according to one example. By coupling the panel(s) 104 to only the thicker portions 326 (and not the thinner portions 324), the opening force required to pull the profiles 310, 312 apart to open the enclosure 400 may be reduced (e.g., relative to the profiles 310, 312 not including the thicker and thinner portions 326, 324). The interface between the thicker and thinner portions 326, 324 may create a lever or pivot point 530 in each profile 310, 312.

During opening of the enclosure 400, the thicker portions 326 may pivot outward away from each other farther than the thinner portions 324, as shown in FIG. 5. The reduced thickness of the last product-side intermeshing element 320 (e.g., the intermeshing element 320 at the product side 330 of the zipper assembly 302) facilitates the opening or separation of the intermeshing elements 316, 320 that project from the thinner portions 324. For example, the reduced thickness of the product-side intermeshing element 320 and/or the lever action between the portions 324, 326 may cause the intermeshing elements 316, 320 projecting from the thinner portions 324 to separate from each other with a reduced separating or opening force than if the lever action was not present and/or the product-side intermeshing element 320 was not thinner, as shown in FIGS. 3 through 5.

Figure 6:
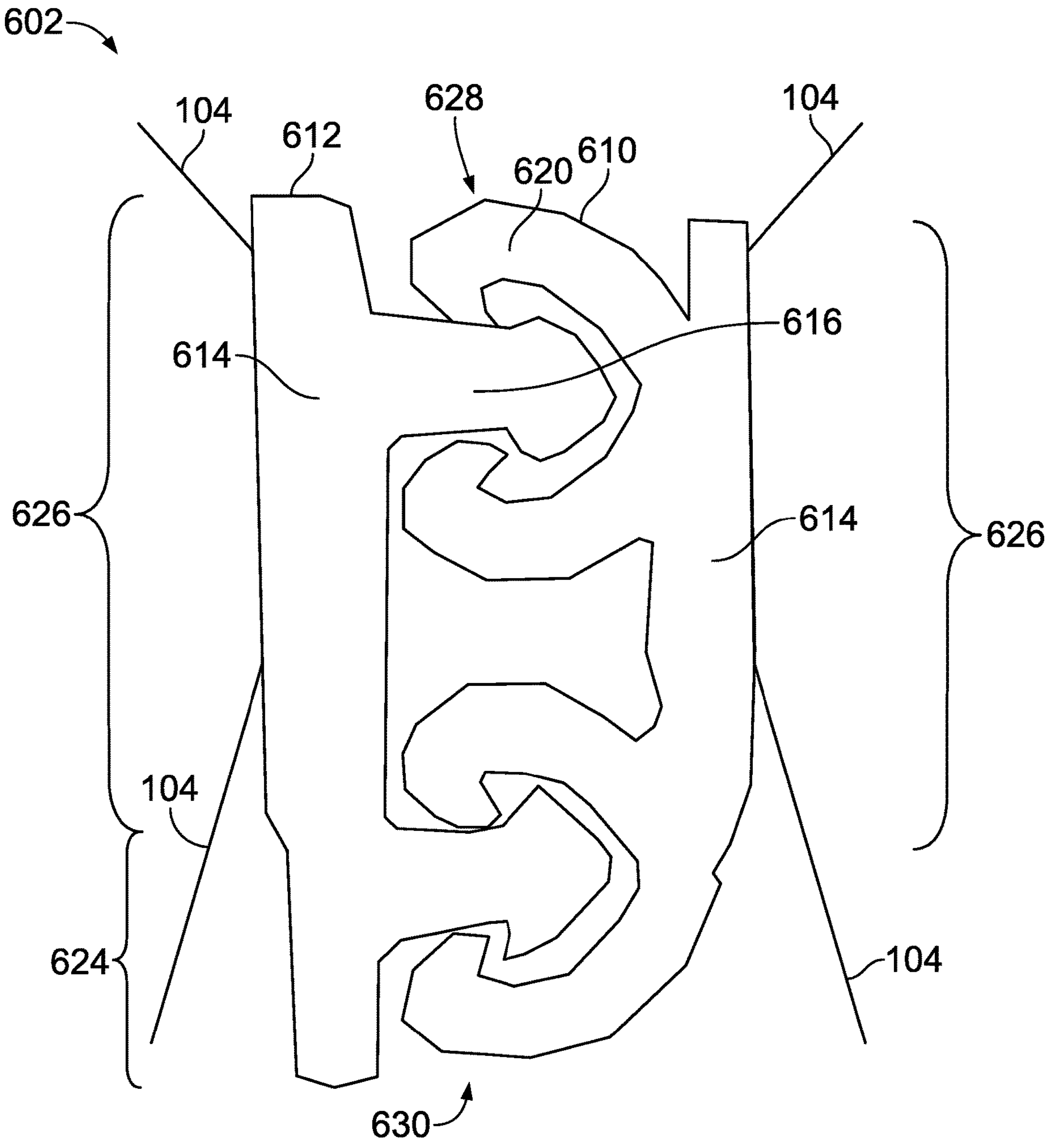
FIG. 6 illustrates a cross-sectional view of a zipper assembly according to an embodiment of the inventive subject matter.

FIG. 6 illustrates a cross-sectional view of a zipper assembly 602 according to an embodiment of the inventive subject matter. The zipper assembly 602 may be used in place of the zipper assembly 102 shown in FIGS. 1 and 2 and/or the zipper assembly 302 shown in FIGS. 3 through 5. The zipper assembly 602 includes intermeshing or interlocking profiles 610, 612. These profiles 610, 612 include support elements 614 with intermeshing or interlocking elements 616, 620 protruding from the support elements 614.

The intermeshing elements 616 are elongated bodies with bulbous heads and the intermeshing elements 620 are C- or U-shaped receptacles sized to receive the heads of the intermeshing elements 616. Receipt of the intermeshing elements 616 into the intermeshing elements 620 secures the profiles 610, 612 together. Removal of the intermeshing elements 616 from the intermeshing elements 620 separates the profiles 610, 612 from each other.

As shown in FIG. 6, the intermeshing or interlocking elements 616, 620 do not include any of the planar, elongated bodies similar to the outermost interlocking element 320 and/or the innermost interlocking element 320 shown in FIG. 3. Alternatively, the profile 610 and/or 612 may include one or more planar, elongated bodies similar or identical to the outermost and/or innermost element 320. The intermeshing or interlocking of the elements 616, 620 keeps the enclosure to which the zipper assembly 602 is joined closed until the user or consumer pulls the panels and profiles 610, 612 apart from each other.

One of the support elements 614 of the zipper assembly 602 includes thinner portions 624 and a thicker portion 626. This can be the support element 614 having the elongated intermeshing elements 616 (e.g., the support element 614 on the left side of FIG. 6). The other support element 614 having the other intermeshing elements 620 (e.g., the support element 614 on the right side of FIG. 6) may not include only a thicker portion 626 and not any thinner portion 624 of the support element 614. Optionally, both the support elements 614 may include one or more thinner portions 624 and one or more thicker portions 626.

The thinner portion 624 may have a smaller thickness (measured along normal or perpendicular directions to back surfaces 618 of the support elements 614, which may be the same directions in which the intermeshing elements 616 are elongated) than the thicker portion 626. In the support element 614 having the intermeshing elements 616, the thinner portion 624 may extend from a product end 630 of the zipper assembly 602 to one end (e.g., the lower end in FIG. 6) of the thicker portion 626. The thicker portion 626 may extend from an opposite consumer end 628 of the zipper assembly 602 to the thinner portion 624. In the support element 614 having the intermeshing elements 620 (e.g., the right side support element 614 in FIG. 6), the support element 614 is formed from the thicker portion 626 that extends from the consumer side or end 628 to the bottom (in FIG. 6) intermeshing element 620, such as the intermeshing element 620 that is closest to the product side or end 630, or that is closer to the product side or end 630 than one or more other intermeshing elements 620 (but not all other intermeshing elements 620).

The panel(s) 104 of the enclosure may be coupled with the support elements 614 of the zipper assembly 602, as shown in FIG. 6. The panels 104 may be coupled with the thicker portions 626 of the profiles 610, 612 but not the thinner portion 624. For example, the panels 104 may be heat sealed to the thicker portions 626 of the profiles 610, 612. The difference in thicknesses between the thinner portion 624 and thicker portion 626 along the back side or surface of the profile 612 and the presence of the thicker portion 626 in the profile 610 can provide a visual and/or tactile (e.g., perceptible by touch) reference or marker for locations to couple the panel(s) 104 to the profiles 610, 612, as described above.

During opening of the enclosure having the zipper assembly 602, the thicker portions 626 may pivot outward away from each other farther than the thinner portions 624, as described above. For example, the lever action between the portions 624, 626 may cause the intermeshing elements 616, 620 to separate from each other with a reduced separating or opening force than if the lever action was not present, also as described above.

Figure 7:
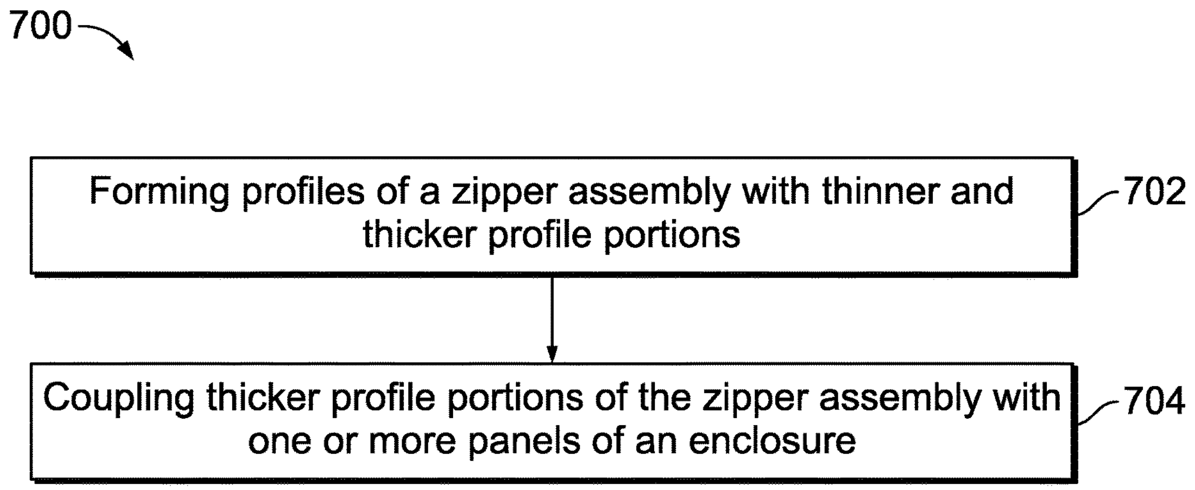
FIG. 7 illustrates a flowchart of one example of a method for forming a zipper assembly for a reclosable enclosure.

FIG. 7 illustrates a flowchart of one example of a method 700 for forming a zipper assembly for a reclosable enclosure. The method 700 may be used to form one or more of the zipper assemblies 302, 602 shown and/or described herein. At 702, intermeshing profiles of the zipper assembly are formed. The profiles may be formed via extrusion, molding, or the like. These profiles can be formed with thicker and thinner portions. For example, the substrates or supporting elements from which the intermeshing elements of the zipper assembly protrude may be formed with alternating thicker and thinner portions. In one embodiment, each profile may include an elongated supporting element with one portion that is thicker than another thinner, portion. For example, each profile may include a single thinner portion on the product side of the profile and a single thicker portion on the consumer side of the profile. Alternatively, a profile may have a single thicker portion and/or another profile may have a thicker portion with thinner portions on either side of the thicker portion. In another example, another arrangement of thicker and/or thinner portions may be provided. Additionally or alternatively, one or more of the intermeshing elements may be made thinner than one or more other intermeshing elements.

At 704, the profiles are coupled with one or more panels of an enclosure. For example, each of the profiles may be connected with a different panel, with the panels coupled together to form the enclosure. As another example, a single panel may be folded and sealed around edges that are laterally on opposite sides or ends of the bend or fold in the panel. The profiles may then be connected to opposite sides of the panel and the opening between these sides of the panel to form the enclosure.

In one example, a zipper assembly for a reclosable enclosure is provided. The zipper assembly may include a first profile having a first elongated supporting element and one or more first intermeshing elements protruding from the first elongated supporting element. The zipper assembly also may include a second profile having a second elongated supporting element and one or more second intermeshing elements protruding from the second elongated supporting element. The one or more first intermeshing elements may releasably interlock with the one or more second intermeshing elements to close the enclosure. Each of the first elongated supporting element and the second elongated supporting element may include a thicker portion and a thinner portion. The thicker portions of the first elongated supporting element and the second elongated supporting element may be coupled with one or more panels of the enclosure. The thicker portions of the first elongated supporting element and the second elongated supporting element may be disposed on a consumer side of the enclosure.

The thicker portions of the first elongated supporting element and the second elongated supporting element may be disposed on the consumer side of the enclosure by being located farther from an interior volume of the enclosure than the thinner portions of the first elongated supporting element and the second elongated supporting element. The thicker portions of the first elongated supporting element and the second elongated supporting element may be thicker than the thinner portions along directions that the one or more first intermeshing elements protrude from the first elongated supporting element and the one or more second intermeshing elements protrude from the second elongated supporting element.

The one or more first intermeshing elements include a first elongated planar body may protrude from the first supporting element. The one or more second intermeshing elements may include a second elongated planar body protruding from the second supporting element. The first elongated planar body may be thicker than the second elongated planar body. The first elongated planar body may be farther from an interior volume of the enclosure than the second elongated planar body.

The thicker portions may include a first thicker portion that is included in the first elongated supporting element. The thinner portions may include a first thinner portion that is included in the second elongated supporting element. The second elongated supporting element may include a second thinner portion and a second thicker portion. The second thicker portion may be between the first thinner portion and the second thinner portion.

The thicker portion in each of the first elongated supporting element and the second elongated supporting element may be longer than the thinner portion in the corresponding first elongated supporting element or the second elongated supporting element. The thicker portion in each of the first elongated supporting element and the second elongated supporting element may extend from a consumer end of the zipper assembly to the thinner portion in the corresponding first elongated supporting element or the second elongated supporting element.

In another example, a zipper assembly is provided that may include a first profile having a first elongated supporting element and one or more first intermeshing elements protruding from the first elongated supporting element. The zipper assembly also may include a second profile having a second elongated supporting element and one or more second intermeshing elements protruding from the second elongated supporting element. The one or more first intermeshing elements may releasably interlock with the one or more second intermeshing elements to close an enclosure. Each of the first elongated supporting element and the second elongated supporting element may include a thicker portion and a thinner portion. The thicker portions may be coupled with one or more panels of the enclosure without the thinner portions being coupled with the one or more panels of the enclosure. The thicker portions may be disposed farther from an interior volume of the enclosure than the thinner portions.

The first elongated supporting element may include at least two of the thinner portions. The thicker portions of the first and second elongated supporting elements may be thicker than the thinner portions of the first and second elongated supporting elements along directions that the first and second intermeshing elements protrude from the corresponding first or second elongated supporting element.

The one or more first intermeshing elements may include a first elongated planar body protruding from the first supporting element. The one or more second intermeshing elements may include a second elongated planar body protruding from the second supporting element. The first elongated planar body may be thicker than the second elongated planar body. The first elongated planar body may be farther from an interior volume of the enclosure than the second elongated planar body. The thicker portions of the first elongated supporting element and the second elongated supporting element may extend from a consumer end of the zipper assembly toward the interior volume of the enclosure.

In another example, a method is provided that may include forming a first profile of a zipper assembly for a reclosable enclosure. The first profile may be formed as having a first elongated supporting element and one or more first intermeshing elements protruding from the first elongated supporting element. The method also may include forming a second profile of the zipper assembly. The second profile may be formed as having a second elongated supporting element and one or more second intermeshing elements protruding from the second elongated supporting element. The one or more first intermeshing elements may be formed to releasably interlock with the one or more second intermeshing elements to close the enclosure. The first elongated supporting element and the second elongated supporting element may be formed as including thicker portions and thinner portions. The thicker portions of the first elongated supporting element and the second elongated supporting element may be formed in a shape to be coupled with one or more panels of the enclosure in locations that are farther from an interior volume of the enclosure than the thinner portions.

The method also may include coupling the thicker portions of the first elongated supporting element and the second elongated supporting element with the one or more panels of the enclosure without the thinner portions of the first elongated supporting element and the second elongated supporting element being coupled with the one or more panels of the enclosure. The thicker portions may be coupled with the one or more panels by heat sealing the thicker portions but not heat sealing the thinner portions to the one or more panels. The thicker portions of the first elongated supporting element and the second elongated supporting element may be formed to extend from a consumer end of the zipper assembly to the thinner portions of the first elongated supporting element and the second elongated supporting element.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A zipper assembly for a reclosable enclosure, the zipper assembly comprising:

a first profile having a first elongated supporting element and one or more first intermeshing elements protruding from the first elongated supporting element; and a second profile having a second elongated supporting element and one or more second intermeshing elements protruding from the second elongated supporting element, the one or more first intermeshing elements configured to releasably interlock with the one or more second intermeshing elements to close the enclosure, wherein each of the first elongated supporting element and the second elongated supporting element includes a thicker portion and a thinner portion, the thicker portions of the first elongated supporting element and the second elongated supporting element configured to be coupled with one or more panels of the enclosure, the thicker portions of the first elongated supporting element and the second elongated supporting element extending from consumer ends of the first elongated supporting element and the second elongated supporting element to the thinner portions of the first elongated supporting element and the second elongated supporting element, the thinner portions of the first elongated supporting element and the second elongated supporting element extending from product ends of the first elongated supporting element and the second elongated supporting element to the thicker portions of the first elongated supporting element and the second elongated supporting element.

2. The zipper assembly of claim 1, wherein the thicker portions and the consumer ends of the first elongated supporting element and the second elongated supporting element are located farther from an interior volume of the enclosure than the thinner portions and the product ends of the first elongated supporting element and the second elongated supporting element.

3. The zipper assembly of claim 1, wherein the one or more first intermeshing elements include a first elongated planar body protruding from the first elongated supporting element and the one or more second intermeshing elements include a second elongated planar body protruding from the second elongated supporting element.

4. The zipper assembly of claim 3, wherein the first elongated planar body is thicker than the second elongated planar body.

5. The zipper assembly of claim 4, wherein the first elongated planar body is farther from an interior volume of the enclosure than the second elongated planar body.

6. The zipper assembly of claim 1, wherein the thicker portion in each of the first elongated supporting element and the second elongated supporting element is longer than the thinner portion in the corresponding first elongated supporting element or the second elongated supporting element.

7. A zipper assembly comprising:

a first profile having a first elongated supporting element and one or more first intermeshing elements protruding from the first elongated supporting element; and a second profile having a second elongated supporting element and one or more second intermeshing elements protruding from the second elongated supporting element, the one or more first intermeshing elements configured to releasably interlock with the one or more second intermeshing elements to close an enclosure, each of the first elongated supporting element and the second elongated supporting element including a thicker portion and a thinner portion, the thicker portions coupled with one or more panels of the enclosure without the thinner portions being coupled with the one or more panels of the enclosure, the thicker portions disposed farther from an interior volume of the enclosure than the thinner portions, the first elongated supporting element extending from a first consumer end to an opposite first product end, the second elongated supporting element extending from a second consumer end to an opposite second product end, the thicker portion of the first elongated supporting element extending from the first consumer end to the thinner portion of the first elongated supporting element, the thinner portion of the first elongated supporting element extending from the first product end to the thicker portion of the first elongated supporting element, the thicker portion of the second elongated supporting element extending from the second consumer end to the thinner portion of the second elongated supporting element, the thinner portion of the second elongated supporting element extending from the second product end to the thicker portion of the second elongated supporting element.

8. The zipper assembly of claim 7, wherein the one or more first intermeshing elements include a first elongated planar body protruding from the first elongated supporting element and the one or more second intermeshing elements include a second elongated planar body protruding from the second elongated supporting element.

9. The zipper assembly of claim 8, wherein the first elongated planar body is thicker than the second elongated planar body.

10. The zipper assembly of claim 9, wherein the first elongated planar body is farther from an interior volume of the enclosure than the second elongated planar body.

11. A method comprising:

forming a first profile of a zipper assembly for a reclosable enclosure, the first profile formed to extend from a first consumer end to an opposite first product end with a first elongated supporting element and one or more first intermeshing elements protruding from the first elongated supporting element between the first consumer end and the first product end; and forming a second profile of the zipper assembly, the second profile formed to extend from a second consumer end to an opposite second product end with a second elongated supporting element and one or more second intermeshing elements protruding from the second elongated supporting element between the second consumer end and the second product end, the one or more first intermeshing elements formed to releasably interlock with the one or more second intermeshing elements to close the enclosure, wherein the first elongated supporting element and the second elongated supporting element are formed as including thicker portions and thinner portions, the thicker portions of the first elongated supporting element and the second elongated supporting element formed in a shape to be coupled with one or more panels of the enclosure in locations that are farther from an interior volume of the enclosure than the thinner portions, the thicker portion of the first elongated supporting element extending from the first consumer end to the thinner portion of the first elongated supporting element, the thinner portion of the first elongated supporting element extending from the first product end to the thicker portion of the first elongated supporting element, the thicker portion of the second elongated supporting element extending from the second consumer end to the thinner portion of the second elongated supporting element, the thinner portion of the second elongated supporting element extending from the second product end to the thicker portion of the second elongated supporting element.

12. The method of claim 11, further comprising:

coupling the thicker portions of the first elongated supporting element and the second elongated supporting element with the one or more panels of the enclosure without the thinner portions of the first elongated supporting element and the second elongated supporting element being coupled with the one or more panels of the enclosure.

13. The method of claim 12, wherein the thicker portions are coupled with the one or more panels by heat sealing the thicker portions but not heat sealing the thinner portions to the one or more panels.

14. The zipper assembly of claim 1, wherein the thicker portions of the first elongated supporting element and the second elongated supporting element continuously extend from the consumer ends of the first elongated supporting element and the second elongated supporting element to the thinner portions of the first elongated supporting element and the second elongated supporting element, and the thinner portions of the first elongated supporting element and the second elongated supporting element continuously extend from the product ends of the first elongated supporting element and the second elongated supporting element to the thicker portions of the first elongated supporting element and the second elongated supporting element.

15. The zipper assembly of claim 7, wherein the first elongated supporting element continuously extends from the first consumer end to the first product end, the second elongated supporting element continuously extends from the second consumer end to the second product end, the thicker portion of the first elongated supporting element continuously extends from the first consumer end to the thinner portion of the first elongated supporting element, the thinner portion of the first elongated supporting element continuously extends from the first product end to the thicker portion of the first elongated supporting element, the thicker portion of the second elongated supporting element continuously extends from the second consumer end to the thinner portion of the second elongated supporting element, the thinner portion of the second elongated supporting element continuously extends from the second product end to the thicker portion of the second elongated supporting element.

16. The method of claim 11, wherein the thicker portion of the first elongated supporting element is formed to continuously extend from the first consumer end to the thinner portion of the first elongated supporting element, the thinner portion of the first elongated supporting element is formed to continuously extend from the first product end to the thicker portion of the first elongated supporting element, the thicker portion of the second elongated supporting element formed to continuously extend from the second consumer end to the thinner portion of the second elongated supporting element, and the thinner portion of the second elongated supporting element is formed to continuously extend from the second product end to the thicker portion of the second elongated supporting element.

17. The zipper assembly of claim 1, wherein (a) the one or more first intermeshing elements and (b) the thicker portion of the first elongated supporting element protrude from the first elongated supporting element in opposite directions, and (c) the one or more second intermeshing elements and (d) the thicker portion of the second elongated supporting element protrude from the second elongated supporting element in the opposite directions.

18. The zipper assembly of claim 7, wherein (a) the one or more first intermeshing elements and (b) the thicker portion of the first elongated supporting element protrude from the first elongated supporting element in opposite directions, and (c) the one or more second intermeshing elements and (d) the thicker portion of the second elongated supporting element protrude from the second elongated supporting element in the opposite directions.

* * * * *